No. 807,639. PATENTED DEC. 19, 1905.
B. A. O. PROLLIUS.
CENTRIFUGAL MILK SEPARATOR.
APPLICATION FILED JULY 29, 1904.

Witnesses

Inventor
Bernhard Adolf Otto Prollius
by Knight Bros
Attys

UNITED STATES PATENT OFFICE.

BERNHARD ADOLF OTTO PROLLIUS, OF COPENHAGEN, DENMARK, ASSIGNOR TO AKTIESELSKABET BURMEISTER & WAINS MASKIN-OG SKIBSBYGGERI, OF COPENHAGEN, DENMARK.

CENTRIFUGAL MILK-SEPARATOR.

No. 807,639.   Specification of Letters Patent.   Patented Dec. 19, 1905.

Application filed July 29, 1904. Serial No. 218,694.

*To all whom it may concern:*

Be it known that I, BERNHARD ADOLF OTTO PROLLIUS, engineer, of No. 50 Torvegade, Copenhagen, Denmark, have invented certain new and useful Improvements in Centrifugal Separators, of which the following is a specification.

The present invention relates to improvements in centrifugal separators, and especially to apparatus employed in the removal of cream from unskimmed milk.

The object of this invention is to arrange the introduction of the milk and the removal of the cream in such a manner that irregularities in the supply may be easily corrected in the milk-inlet as well as in the creamway, so that equalization of the pressure is facilitated and the separated cream is prevented from adhering to the inlet-tubes.

The invention is shown in the accompanying drawings, in which—

Figure 1:
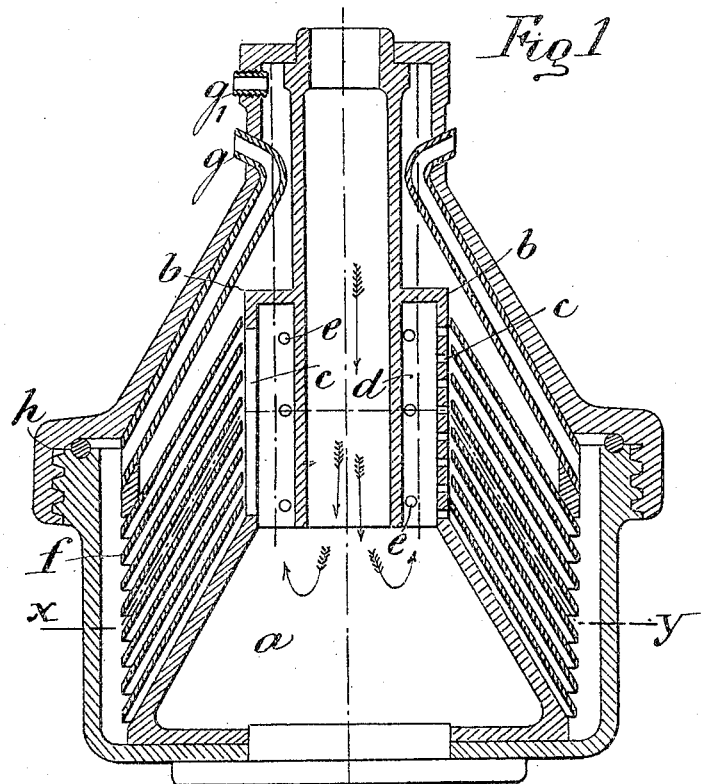
Figure 2:
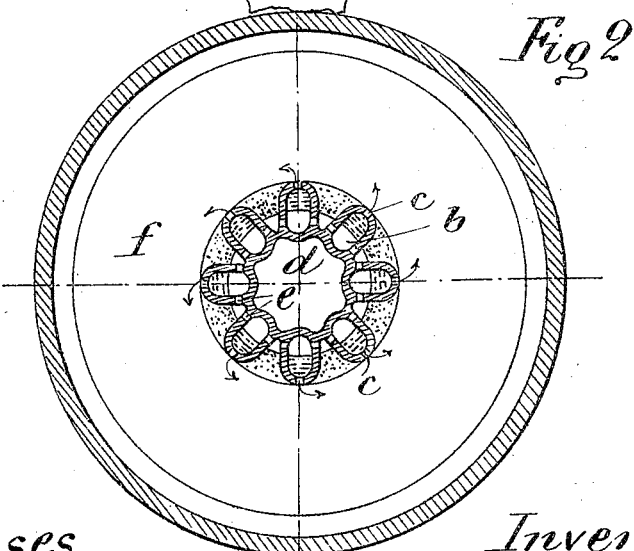

Figure 1 is a vertical section of a centrifugal separator with the improvements, and Fig. 2 is a horizontal section on the line $xy$ in Fig. 1.

The milk is introduced into the inlet-chamber $a$ in any suitable manner, from which chamber it rises through a series of inlet-tubes $b$ arranged concentric with the axis of the apparatus. Each of these concentric inlet-tubes $b$ is provided with slots or holes $c$, which open to the nest of conical plates $f$ of the centrifugal apparatus $h$.

The outlets $g$ $g'$ of the centrifugal apparatus are arranged at such a distance from the axis that the inlet-tubes $b$ cannot be completely filled, thus producing a layer or cushion $d$ of air on the inner side of each of the concentric inlet-tubes. These layers of air $d$ communicate with the exterior of the inlet-tubes through small openings $e$ in the walls of the same.

The apparatus works in the following manner: The unskimmed milk flows from the concentric inlet-tubes $b$ through slots or holes $c$ out onto the conical plates $f$, while the cream gathers outside and between the said concentric tubes, so that air layers are also formed within the inner side of the cream layer. If now the feeding of the centrifugal apparatus is unequal, (which difficulty may be avoided,) the pressure within the tubes $b$, as well as within the inner side of the cream layer, is equalized by means of the said air layers, and this equalization is facilitated by the fact that the said air layers are mutually connected by means of the small openings $e$. Further, the cream particles, which eventually are separated by the centrifugal force in the concentric tubes $b$, cannot adhere to the inner side of said tubes, but will be carried away by the current of the milk and thrown out through the upper part of the slots or holes $c$ of the concentric tubes. The cream particles on the inner side of the cream layer are also prevented from adhering to the outside of the tubes by the layer of air between the cream and the said tubes.

Having now described and ascertained the nature of my said invention, I declare that what I claim is—

1. In a centrifugal apparatus, the combination with the inlet-chamber, of a plurality of liner-plates spaced from one another, a plurality of vertical feed-tubes communicating with the inlet-chamber and having holes opening into the spaces between the liner-plates, said tubes being arranged concentric relatively to the axis of the apparatus and having the inner portion of their hollow space out of the path of the liquid to be separated, substantially as set forth and for the purpose described.

2. In a centrifugal apparatus, the combination with the inlet-chamber, of a plurality of liner-plates spaced from one another, a plurality of vertical feed-tubes spaced apart and communicating with the inlet-chamber and having holes opening into the spaces between the liner-plates, said tubes being arranged concentric relatively to the axis of the apparatus and having the inner portion of their hollow space out of the path of the liquid to be separated, the walls of said inner portions having openings providing communication between the tubes and their intermediate spaces, substantially as set forth and for the purpose described.

3. In a centrifugal milk-separator, the combination with the inlet-chamber, of a plurality of liner-plates spaced from one another, a plurality of vertical feed-tubes spaced apart and communicating with the inlet-chamber and having holes opening into the spaces between the liner-plates, said tubes being arranged concentric relatively to the axis of the separator and having the inner portion of their hollow space out of the path of the milk to be separated, the inner portion of the spaces between the feed-tubes being positioned interior of the cream zone of the separator and the walls of the feed-tubes having openings providing communication between the inner portion of the feed-tubes and their intermediate spaces, substantially as set forth and for the purpose described.

In witness whereof I have hereunto set my hand in presence of two witnesses.

BERNHARD ADOLF OTTO PROLLIUS.

Witnesses:
    MARCUS MÓLLER,
    MAGNUS JENSEN.